US012789481B2

(12) United States Patent
Ariño Palacín et al.

(10) Patent No.: US 12,789,481 B2
(45) Date of Patent: Nov. 10, 2026

(54) VACUUM INFUSION SYSTEM AND METHOD FOR VACUUM INFUSING A FIBRE REINFORCEMENT WITH A RESIN

(71) Applicants: Fundació EURECAT, Cerdanyoia del Vallès (ES); UNIVERSITAT DE GIRONA, Girona (ES)

(72) Inventors: María Ariño Palacín, Vila Nova de Gaia (PT); Josep Costa Balanzat, Girona (ES); Cristian Builes Cárdenas, Cerdanyola del Vallès (ES); Manuel Ángel Bermúdez Ayerbe, Cerdanyola del Vallès (ES); María Eugenia Rodríguez Sierra, Cerdanyola del Vallès (ES)

( * ) Notice: Subject to any disclaimer, the term of this patent is extended or adjusted under 35 U.S.C. 154(b) by 0 days.

(21) Appl. No.: 18/712,776

(22) PCT Filed: Nov. 23, 2022

(86) PCT No.: PCT/EP2022/082987
§ 371 (c)(1),
(2) Date: May 23, 2024

(87) PCT Pub. No.: WO2023/094454
PCT Pub. Date: Jun. 1, 2023

(65) Prior Publication Data

US 2025/0018664 A1 Jan. 16, 2025

(30) Foreign Application Priority Data

Nov. 23, 2021 (EP) .................................... 21383057

(51) Int. Cl.

| | |
|---|---|
| ***B29C 70/48*** | (2006.01) |
| ***B29C 70/06*** | (2006.01) |
| *B29K 307/04* | (2006.01) |

(52) U.S. Cl.
CPC .............. *B29C 70/48* (2013.01); *B29C 70/06* (2013.01); *B29K 2307/04* (2013.01); *B29K 2883/00* (2013.01); *B29K 2995/007* (2013.01)

(58) Field of Classification Search
CPC ......... B29C 70/48; B29C 70/44; B29C 70/40; B29C 70/28; B29C 70/04; B29C 70/06
See application file for complete search history.

(56) References Cited

U.S. PATENT DOCUMENTS

| | | | | |
|---|---|---|---|---|
| 2006/0017200 A1* | 1/2006 | Cundiff | ................. | B29C 70/541 425/389 |
| 2011/0169190 A1* | 7/2011 | Miller | .................. | B29D 23/001 425/447 |

(Continued)

FOREIGN PATENT DOCUMENTS

| | | | |
|---|---|---|---|
| DE | 102008017381 A1 * | 10/2009 | ............ B29C 70/44 |

*Primary Examiner* — Cedrick S Williams
(74) *Attorney, Agent, or Firm* — Eugenio J. Torres-Oyola; Victor M. Rodriguez-Reyes; Rafael Rodriguez-Muriel

(57) ABSTRACT

The present invention discloses a vacuum infusion system for infusing a fibre reinforcement with a resin comprising: a mould having a mould cavity comprising at least one moulding element for the reception of a fibre reinforcement, the system further comprising at least one counter mould comprising one or more flexible parts, each flexible part including at least one curved region for forming at least one curved region on the fibre reinforcement infused with resin; and a pressure applying configuration contributing to apply a pressure at least on the at least one curved region of the one or more flexible parts of the counter mould, to transmit a pressure to the at least one curved region of the fibre reinforcement infused with resin, said pressure applying configuration being configured for increasing the fibre volume ratio and/or reducing the void content of the composite moulded component.

15 Claims, 9 Drawing Sheets

(56) References Cited

U.S. PATENT DOCUMENTS

| | | | | |
|---|---|---|---|---|
| 2016/0355702 | A1* | 12/2016 | Eguchi | B29C 70/443 |
| 2019/0210306 | A1* | 7/2019 | Tokutomi | B29C 43/14 |
| 2020/0063242 | A1* | 2/2020 | Valls Anglés | B22F 3/1233 |

* cited by examiner

VACUUM INFUSION SYSTEM AND METHOD FOR VACUUM INFUSING A FIBRE REINFORCEMENT WITH A RESIN

TECHNICAL FIELD

The present invention relates to the field of manufacturing of composite materials, and in particular, to the field of vacuum infusion.

The invention provides a system and a method for vacuum infusing a fibre reinforcement with a resin to produce a composite moulded component. The invention also discloses a composite moulded component obtainable by the method of the present invention.

BACKGROUND ART

Liquid Composite Moulding (LCM) comprises the composite manufacturing methods where a liquid state matrix material (e.g., epoxy resin) is forced into a dry preformed reinforcing material, laminate, or fibre reinforcement (e.g., carbon fibre). Liquid Composite Moulding (LCM) intends to reach a full impregnation of the reinforcing material as the resin propagates between the fibre bundles and fibres. In order to obtain a full and uniform impregnation of the reinforcing material it is important that the reinforcing material has a good preform permeability. The impregnation driving force is usually resulting from pressure difference. Resin Transfer Moulding (RTM) uses positive operating pressures, while in Vacuum Infusion (VI) the pressure is lower than the atmospheric pressure level. Usually, positive operating pressure techniques require matched moulding (moulds made of two or more parts), while vacuum infusion is usually done using a flexible membrane (e.g., polymer foil) on the mould. Using matched moulding is usually substantially more expensive than using flexible membranes.

In known Vacuum Infusion (VI) processes vacuum is used to drive resin into a fibre reinforcement or preform. In this known process, a preform or fibre reinforcement is placed into a mould cavity fluidly connected to a resin reservoir and to a vacuum pump. Subsequently, vacuum, i.e., a pressure below atmospheric, is applied to the inside of the mould cavity which will apply a suction force on the resin of the resin reservoir which will draw the resin through the mould cavity so that the fibre reinforcement, laminate or preform is infused with such resin. The mould cavity can be a two-sided mould, a one-sided mould or even a soft bag, commonly known as vacuum bag. Among other benefits, Vacuum Infusion (VI) enables very high fibre volume ratios, and the mechanical properties of the infused fibre reinforcements are superior to other processes known in the art. However, there is still a need for improving the fibre volume ratio and the mechanical properties of moulded composite components obtained by Vacuum Infusion (VI).

A particular case of a Vacuum Infusion (VI) process is known as Vacuum Assisted Resin Transfer Moulding (VARTM). Vacuum Assisted Resin Transfer Moulding (VARTM) is a closed-mould process that is capable of manufacturing high performance and large-scale fibre reinforced polymer (FRP) parts with relatively low tooling cost. In Vacuum Assisted Resin Transfer Moulding (VARTM) processes, the composite part is moulded using a rigid mould having a mould cavity, wherein the fibre reinforcement is placed, sealed by a vacuum bag or film. As in common Vacuum Infusion processes, in Vacuum Assisted Resin Transfer Moulding resin from a resin reservoir is drawn through the preform or fibre reinforcement using vacuum.

AR109420A1 relates to a vacuum bag for manufacturing pieces by vacuum infusion and a system comprising the same. In particular, AR109420A1 discloses a vacuum bag comprising a flexible hollow structure, at least one inlet for a pressurised fluid connected to an internal system of channels, wherein said channels connect preformed areas that inflate under the effect of the pressurised gas or fluid generating protrusions on the surface of the membrane.

By inflating the bag and generating the protrusions on its surface, the vacuum bag disclosed in AR109420A1 allows to control the flow and distribution of the resin. AR 109420A 1 teaches that the vacuum bag should be deflated, i.e., its internal pressure should be removed, before the resin is cured.

IN201841011637 relates to a vacuum infusion method for producing a moulded component and a system employed in the method for producing a moulded component. Indian patent application number 201841011637 discloses a flexible counter mould to be placed on a reinforcement mat to be moulded that is placed on a rigid mould. A vacuum is created between the flexible counter mould and the rigid mould to facilitate resin infusion of the reinforcement mat. Said flexible counter mould is made of a fibre reinforced plastic with highly flexible resin systems like polyester or epoxy resin.

DE 102008017381 A1 discloses a method for producing components made of fibre composite materials, said method being intended to prevent displacement of fibre layers in curved regions having a small inner radius. The undesired displacement of fibres that DE 102008017381 A1 discloses usually leads to raised areas and reduced fibre volume ratios.

In the method disclosed by DE 102008017381 A1 fibre layers are covered with a vacuum film in a forming tool, defining a mould cavity. DE 102008017381 A1 discloses pressing the vacuum film against the fibre layers during evacuation of the mould cavity, i.e. while vacuum is drawn between the vacuum film and the forming tool, with a pressure distribution adapted to the contour of the mould. In order to do so, DE 102008017381 A1 discloses placing a carrier structure on the vacuum film to apply a pressure distribution to the vacuum film, which transmits it to the fibre layers. Said carrier structure can comprise pressure elements and/or suction elements to apply the pressure distribution. The pressure elements can comprise an elastic membrane that can be inflated by hydraulic or pneumatic pressure.

In DE 102008017381 A1 pressure is applied during evacuation of the vacuum film, which means before infusing resin to the fibre layers, and thus, the high pressure applied by the carrier structure decreases the preform permeability of the fibre layers, as pressure is inverse proportional to preform permeability, and prevents, or at least hinders, resin impregnation of the fibre layers. As a result, composite components obtained following the disclosure of DE 102008017381 A1 can have dry zones, i.e., zones not properly infused with resin, and poor quality.

US 2006/0017200 A1 discloses methods and systems for manufacturing fibre-reinforced resin parts. US 2006/0017200 A1 is directed to reducing bridging of fibre plies across internal radii of curved mould surfaces. The method disclosed in US 2006/0017200 A1 comprises: positioning a plurality of fibres on a mould surface of a tool; covering the fibres with a sealing layer; pressing a portion of the covered fibres against a curved region of the mould surface with a pressing device; and while pressing the portion of covered fibres against the curved region, removing air from between the sealing layer and the mould surface to draw at least a partial vacuum between the sealing layer and the mould surface. Said pressing device can include an inflatable member or a mechanical driver.

In US 2006/0017200 A1 the covered fibres are pressed before drawing vacuum between the sealing layer and the mould surface. Therefore, the fibres are pressed before they are infused with resin, similar to what DE 102008017381 A1 discloses. Likewise, the pressure applied by the pressing device disclosed in US 2006/0017200 A1 reduces the preform permeability, thereby resulting in fibre-reinforced resin parts having dry zones and poor quality.

In both DE 102008017381 A1 and US 2006/0017200 A1 it is disclosed to arrange the pressing device on top of the vacuum film, so that pressure is applied to the vacuum film, which transmits it to the fibre reinforcement as the vacuum film disclosed therein is in direct contact with the fibre reinforcement.

Even though known vacuum infusion systems and methods produce high quality parts, such systems and methods cannot produce parts or moulded components that meet the highest requirements of the most demanding industries, such as aerospace, etc; or may produce them requiring complex and expensive tooling that increases the cost of the moulded component. In particular, a common problem of known vacuum infusion systems and methods is related to the production of moulded components having intersecting planes and/or curved regions. Intersecting planes define an intersecting region. Usually, intersecting regions produced with vacuum infusion methods do not produce sharp edges. Instead, said intersecting regions usually define rounded edges, i.e., curved regions, of small radius. In said intersecting regions of moulded components produced with known vacuum infusion methods the fibre volume ratio is reduced and the void content is increased as compared to the straight or substantially straight, i.e. planar, or slightly curved, portions of the moulded component. This produces a variability of the mechanical properties of the moulded components, which should be avoided, especially in high demanding and critical applications, such as in the aerospace industry. The reduction of the fibre volume ratio and increase of void content in the curved regions of composite components using known vacuum infusion processes are mainly due to a reduction of the pressure applied to said curved region in comparison with the planar or straight regions when the resin of the fibre reinforcement infused with resin is being cured. This reduction of the fibre volume ratio and increase of void content produces undesired weakness zones in the composite moulded component.

In the aerospace industry it is a common requirement that composite components of parts must have a fibre volume ratio of at least 60% and a void content lower than 2%. Traditional vacuum infusion processes produce composite moulded components having a fibre volume ratio lesser than 55% and with a void content greater than 4%, thus not meeting such requirements.

The production of composite moulded components that meet the highest requirements, such as the ones of the aerospace industry, by the use of autoclaves is known in the art. However, the production of composite components by using autoclaves requires a high investment and is highly energy consuming, which makes the components produced by such method very expensive.

BRIEF DESCRIPTION OF THE INVENTION

In order to address one or more of the foregoing problems, and in particular, in order to provide a vacuum infusion system that produces composite moulded components having a high fibre volume ratio—also known as fibre volume fraction—and a low void content, while maintaining a relatively low tooling cost, a novel vacuum infusion system is proposed. Such system for infusing a fibre reinforcement with a resin to produce a composite moulded component comprises: a mould having a mould cavity comprising at least one moulding element for the reception of a fibre reinforcement; at least one layer for being placed on the fibre reinforcement, said layer being configured to avoid adhesion to the fibre reinforcement; a film for sealing the mould cavity; a resin reservoir fluidly connected to a first end of the mould cavity; a vacuum pump fluidly connected to a second end of the mould cavity, said second end being opposite to the first end, wherein the system further comprises at least one counter mould comprising one or more flexible parts, each flexible part including at least one curved region for forming at least one curved region on the fibre reinforcement infused with resin; and a pressure applying configuration contributing to apply a pressure at least on the at least one curved region of the one or more flexible parts of the counter mould, to transmit a pressure to the at least one curved region of the fibre reinforcement infused with resin, said pressure applying configuration being configured for increasing the fibre volume ratio and/or reducing the void content of the composite moulded component.

According to the present invention, the mould cavity closed by the film for sealing the mould cavity comprises therein the at least one counter mould and the fibre reinforcement, that is to say, the counter mould is comprised between the fibre reinforcement and the film for sealing the mould cavity. In contrast, both DE 102008017381 A1 and US 2006/0017200 A1 disclose a pressuring device arranged on top of the vacuum film, thereby applying the pressure to the fibre reinforcement via the vacuum film. Placing the pressuring device on top of the vacuum film can cause vacuum bag bridging effect on the curved regions, which results in resin accumulation and air entrapment, which should be avoided, as it results in a part or component of poor quality. The present invention avoids the aforementioned vacuum bag bridging effect by placing the counter mould inside of the vacuum bag, i.e., inside of the moulding cavity defined by the mould and the film for sealing the mould cavity.

When compared with the disclosure of both DE 102008017381 A1 and US 2006/0017200 A1, the present invention avoids the vacuum bag bridging effect and the reduced preform permeability from which both prior art invention disclosures suffer.

The vacuum infusion system of the present invention provides composite moulded components having a void content of 2% or less and a fibre volume ratio of 60% or more throughout its entire cross-section. Moreover, composite moulded components produced with the system object of the present invention have homogeneous mechanical properties throughout their entire cross-section and length.

The present invention achieves the above by improving the pressure distribution throughout the entire cross-section of the fibre reinforcement infused with resin while the resin is being cured.

The membrane or film for sealing the mould cavity may commonly be known as vacuum bag. The curved region(s) of the fibre reinforcement are preferably in an internal angle defined by the intersection of a pair of planes of the fibre reinforcement. Preferably, said curved region(s) are fillets defined in the intersection of a pair of planes of the fibre reinforcement. However, said curved region(s) can also be in the form of rounded groove(s) or channel(s), among others.

According to the present invention, the system may be configured to create a vacuum of 100 mbar or less of absolute pressure in the mould cavity. Preferably, the system is configured to create a vacuum of 50 mbar or less of absolute pressure in the mould cavity. More preferably, the system is configured to create a vacuum of 20 mbar or less of absolute pressure in the mould cavity.

According to the present invention, the mould cavity may be preferably defined as the space or volume defined between the mould and the film for sealing the mould cavity. Preferably, the counter mould is housed within the mould cavity, i.e., the counter mould is placed between the mould and the film for sealing the mould cavity. Alternatively, the mould cavity may be defined as the space or volume defined between the mould and the counter mould. The mould cavity houses the fibre reinforcement.

According to the present invention, the at least one counter mould may be inserted in the mould cavity, said cavity being closed in a gas-tight manner by the film for sealing the mould cavity.

According to the present invention, the fibre reinforcement may be placed in a moulding element of the mould cavity, the at least one layer for being placed on the fibre reinforcement may be placed between the fibre reinforcement and the at least one counter mould; and the film for sealing the mould cavity may be placed over the counter mould. Said film may, or may not, be in contact with the furthermost surface of the counter mould.

According to the present invention, the pressure applying configuration may contribute to apply a first pressure to the at least one curved region of the fibre reinforcement and a second pressure to other regions of the fibre reinforcement different to the at least one curved region, the first pressure being equal or greater than the second pressure, i.e., the pressure applying configuration may contribute to apply a first pressure to the curved region(s) of the fibre reinforcement and a second pressure to the non-curved region(s) of the fibre reinforcement. Said pressure applied to the fibre reinforcement infused with resin may be known as compacting pressure.

Said other regions of the fibre reinforcement different to the at least one curved region can be, for example, planar regions or also slightly curved regions or simply non-curved regions, i.e., regions having a curvature radius greater than the one of the at least one curved region, i.e., regions having a curvature radius greater than 10 mm, preferably greater than 12 mm, more preferably greater than 15 mm.

By applying a compacting pressure to both the curved and non-curved region(s), the compacting pressure applied to the curved region(s) being preferably equal or greater than the one applied to the non-curved region(s), a balance of the compacting pressure throughout the entire cross-section of the composite moulded component is achieved. As a result, uniform properties throughout the entire cross-section of the composite moulded component are further ensured, and in particular, a uniform fibre volume fraction and void content is further ensured throughout the entire cross-section.

Preferably, the at least one planar region and the at least one curved region are contiguous.

According to the present invention, the at least one curved region of the counter mould may be made of a flexible material having a Poisson ratio greater than 0.4. Preferably, said flexible material has a Poisson ratio greater than 0.45. Even more preferably, said flexible material has a Poisson ratio greater than 0.47.

According to the present invention, the counter mould may be made of a flexible material having a Poisson ratio greater than 0.4, i.e., the entire counter mould may be made of a flexible material having a Poisson ratio greater than 0.4. Preferably, said flexible material has a Poisson ratio greater than 0.45. Even more preferably, said flexible material has a Poisson ratio greater than 0.47.

According to the present invention, at least said one or more flexible parts of the counter mould may be made of silicone having a Shore A hardness equal or greater than 20; preferably equal or greater than 40; more preferably equal or greater than 55.

According to the present invention, the counter mould, i.e., the whole counter mould, may be made of silicone having a Shore A hardness equal or greater than 20; preferably equal or greater than 40; more preferably equal or greater than 55.

According to the present invention, the at least one curved region of the counter mould in contact with the at least one curved region of the fibre reinforcement may comprise at least one chamber inflatable by a pressurised fluid, said chamber being located and configured to apply a pressure to the at least one curved region of the fibre reinforcement infused with resin.

Said pressurised fluid may be a gas, such as air, or a liquid, such as water or oil. Other suitable fluids can also be used.

According to the present invention, the counter mould may comprise at least a recess for receiving and partially housing the tubular chamber made of a flexible material.

According to the present invention, said tubular chamber may be made of silicone or rubber. However, other materials having suitable properties can also be used.

According to the present invention, the vacuum infusion system may further comprise a pressing unit for applying a pressure to the at least one counter mould in a direction perpendicular to a longitudinal axis of the moulded component configured for further increasing the fibre volume ratio and/or reducing the void content of the composite moulded component. Said press may be mechanical or hydraulic and further increases the fibre volume ratio of the composite moulded component and decreases its void content. Therefore, said press, by further increasing the fibre volume ratio and void content of the composite moulded component, further increases the mechanical properties of the composite moulded component with respect to the system according to claim 1, which as stated above, already increases the fibre volume ratio and decreases the void content of the composite moulded component with respect to known vacuum infusion processes, as well as the uniformity of said fibre volume ratio and said void content throughout the entire cross-section of the moulded component.

According to the present invention, the at least one moulding element may be a surface of the moulding cavity.

According to the present invention, the at least one moulding element may be at least one counter mould.

According to the present invention, the counter mould acting as a moulding element may comprise at least a chamber inflatable by a pressurised fluid, said chamber being located and configured to apply a pressure to the at least one curved region of the fibre reinforcement infused with resin.

According to the present invention, at least said one or more flexible parts of the counter mould may be made of a material having a Poisson's ratio greater than 0.45; preferably greater than 0.47.

According to the present invention, in embodiments having two or more counter moulds, all counter moulds are made from the same material and have the same properties. However, it is also possible that each counter mould is made from a different material having different properties.

According to the present invention, the at least one layer for being placed on the fibre reinforcement to avoid adhesion may comprise a peel ply. A peel ply, which may also be known as release fabric, is a layer that avoids adhesion to the fibre reinforcement, and particularly, avoids adhesion of the counter mould and/or other auxiliar components to the laminate or fibre reinforcement. A peel ply does not stick to the fibre reinforcement and is preferably resin permeable.

According to the present invention, the at least one layer for being placed on the fibre reinforcement to avoid adhesion may further comprise a flow mesh for aiding the flow of resin.

According to the present invention, the flow mesh may be made of polyamide or polypropylene, among other suitable materials.

According to a second aspect of the present invention, it is disclosed a vacuum infusion method for infusing a fibre reinforcement with a resin to produce a composite moulded component, the method comprising the following steps:

- providing a mould with a mould cavity and at least one counter mould with at least one curved region;
- laying the fibre reinforcement on the mould cavity;
- placing at least one layer on the fibre reinforcement, said layer being configured to avoid adhesion of the fibre reinforcement;
- at least partially inserting the at least one counter mould in the mould cavity, on the at least one layer, said at least one counter mould comprising at least one curved region for forming at least one curved region on the fibre reinforcement contained between the mould and the curved region of the counter mould;
- sealing the mould cavity;
- creating a vacuum in the mould cavity with a vacuum pump fluidly connected to a first end of the mould cavity;
- providing a resin supply to a second end of the mould cavity, said second end being opposite to the first end;
- infusing the fibre reinforcement with the resin;
- applying a pressure at least on the at least one curved region of the counter mould against the mould with a pressure applying configuration, transmitting a pressure to the at least one curved region of the fibre reinforcement infused with resin, i.e. applying a pressure to the at least one curved region of the fibre reinforcement infused with resin with the at least one curved region of the counter mould;
- curing the resin; wherein
- the curved regions of the counter mould are flexibly deformed under the pressure applied thereto, maintaining the pressure during the curing of the resin.

Preferably, the aforementioned steps are followed in consecutive order.

According to the second aspect of the present invention, the mould cavity may be sealed with a film for sealing the mould cavity.

According to the second aspect of the present invention, the at least one counter mould may be housed in the mould cavity, which is defined between the mould and the film for sealing the mould cavity.

According to the second aspect of the present invention, a vacuum of 100 mbar or less of absolute pressure is created in the mould cavity. Preferably, a vacuum of 50 mbar or less of absolute pressure is created in the mould cavity. More preferably, a vacuum of 20 mbar or less of absolute pressure is created in the mould cavity.

According to the present invention, the mould cavity may be preferably defined as the space or volume defined between the mould and the film for sealing the mould cavity. Preferably, the counter mould is housed in the mould cavity, i.e., the counter mould is placed between the mould and the film for sealing the mould cavity. Alternatively, the mould cavity may be defined as the space or volume defined between the mould and the counter mould. The fibre reinforcement is placed in the mould cavity.

According to the second aspect of the present invention, the counter mould may further comprise other regions, different to the curved regions, for forming at least one other region on the fibre reinforcement different to the curved region; and wherein a first pressure may be applied with the pressure applying configuration to the at least one curved region of the fibre reinforcement and a second pressure may be applied to the at least one other region, the first pressure being equal or greater than the second pressure. Said other region can be, for example, a planar region or a slightly curved region. That is to say, besides the curved region(s), the counter mould may further comprise non-curved region (s), wherein the curved region(s) of the counter mould apply a first pressure to the curved region(s) of the fibre reinforcement infused with resin and the non-curved region(s) of the counter mould apply a second pressure to the non-curved region(s) of the fibre reinforcement infused with resin.

According to the second aspect of the present invention, the pressure to the at least one curved region of the fibre reinforcement may be applied with a chamber inflatable by a pressurized fluid located in correspondence with the at least one curved region and comprised in a counter mould. Said chamber may be a tubular chamber made of a flexible material housed in a respective recess of the counter mould or be integral with the counter mould.

According to the second aspect of the present invention, the method may further comprise a step of applying a pressure to the at least one counter mould in a direction perpendicular to a longitudinal axis of the moulded component, after infusing the fibre reinforcement with resin and before curing the resin, to further increase the fibre volume ratio of the composite moulded component. This step further increases the fibre volume ratio of the composite moulded component and further decreases its pore void content, thus increasing the mechanical properties of the composite moulded component, in respect to the vacuum infusion method according to claim 11, or simply, in respect to the base vacuum infusion method according to the present invention. Said increase of the mechanical properties of the composite moulded component is greater when compared to the mechanical properties of known vacuum infusion methods.

According to the second aspect of the present invention, the at least one moulding element may preferably comprise at least one layer for avoiding adhesion to the fibre reinforcement.

According to the second aspect of the present invention, the at least one layer for being placed on the fibre reinforcement to avoid adhesion may further comprise a flow mesh for aiding the flow of resin.

According to the second aspect of the present invention, the at least one counter mould may be inserted in the mould cavity, said cavity being sealed in a gas tight manner with a film for sealing the mould cavity.

According to the second aspect of the present invention, the fibre reinforcement may be laid on a moulding element of the mould cavity, the at least one layer may be placed between the fibre reinforcement and the at least one counter mould; and the film for sealing the mould cavity may be placed over the counter mould.

According to the second aspect of the present invention, the at least one moulding element may be a surface of the mould cavity.

According to the second aspect of the present invention, a pressure of from 0.5 to 20 bars may be applied to the at least one curved region of the fibre reinforcement.

According to the second aspect of the present invention, a pressure of from 1.5 to 20 bars may be applied to the at least one counter mould in a direction perpendicular to a longitudinal axis of the moulded component. Said pressure of from 1.5 to 20 bars is preferably applied with a pressure unit.

According to the second aspect of the present invention, a pressure of from 0.5 to 5 bars is applied to the at least one curved region of the fibre reinforcement by a tubular chamber inflatable by a pressurised fluid. According to the second aspect of the present invention, the fibre reinforcement may be made of at least one of: carbon fibre, glass fibre, poly (p-phenylenediamine terephthalamide), poly (m-phenylenediamine isophthalamide), thermoplastic fibres, basalt fibres or natural fibres, among other suitable materials. Poly (p-phenylenediamine terephthalamide) is commonly known as Nomex®. Poly (m-phenylenediamine isophthalamide) is commonly known as Kevlar®.

According to the second aspect of the present invention, the fibre reinforcement may have a rectangular U, T, Z, H, I or Y cross-section. However, other cross-sections having one or more pairs of intersecting planes are also possible.

According to a third aspect of the present invention it is disclosed a composite moulded component obtainable by a vacuum infusion method according to the second aspect of the present invention.

A composite moulded component according to the third aspect of the present invention has a high fibre volume ratio, a low void content and uniform mechanical properties throughout its entire cross-section, i.e., the mechanical properties in planar regions or portions of the moulded component are the same, or substantially the same, as in its curved regions. In particular, a composite moulded component according to the third aspect of the present invention has a void content of 2% or less and a fibre volume ratio of 60% or more throughout its entire cross-section. Moreover, the composite moulded component of the third aspect of the present invention is obtained by using at least one layer for avoiding adhesion of the fibre reinforcement to the counter mould, said composite moulded component has a good surface finish.

According to the third aspect of the present invention, the composite moulded component may have a U, T, Z, H, I or Y cross-section. However, other cross-sections having one or more pairs of intersecting planes are also possible.

According to a fourth aspect of the present invention, it is disclosed a vacuum infusion system for infusing a fibre reinforcement with a resin to produce a composite moulded component comprising: a mould having a mould cavity comprising at least one moulding element for the reception of a fibre reinforcement; a rigid counter mould for forming at least one curved region on the fibre reinforcement infused with resin; at least one layer for being placed on the fibre reinforcement, said layer being configured to avoid adhesion to the fibre reinforcement; a film for sealing the mould cavity; a resin reservoir fluidly connected to a first end of the mould cavity; a vacuum pump fluidly connected to a second end of the mould cavity, said second end being opposite to the first end; wherein the mould comprises a pressure applying configuration to apply a pressure to the at least one curved region of the fibre reinforcement infused with resin, said pressure applying configuration being configured for increasing the fibre volume ratio and/or reducing the void content of the composite moulded component. According to the fourth aspect of the present invention, at least one curved region of the mould in contact with the at least one curved region of the fibre reinforcement comprises at least one chamber inflatable by a pressurised fluid, said chamber being located and configured to apply a pressure to the at least one curved region of the fibre reinforcement infused with resin.

According to the fourth aspect of the present invention, the mould comprises at least one recess for receiving and partially housing the tubular chamber made of a flexible material.

In the present invention curved regions may be understood as fillets between a pair of intersecting planes having a curvature radius of from 1 mm to 10 mm. Preferably said radius of curvature is of from 3 mm to 8 mm. More preferably said radius of curvature is of from 4 mm to 7 mm.

What in this document is understood as a mould may also referred in the art as a female or negative mould, whereas what in this document is understood as a counter mould may also be referred in the art as a male or positive mould.

In the context of the present invention, 'x' comprising 'y' should be understood as 'y' being integral with 'x' or as 'y' being a different element than 'x' but being associated in closely relation with 'x'. In the context of the present invention 'comprising' is open-ended and does not exclude additional, unrecited elements It will be understood that references to geometric position, such as parallel, perpendicular, tangent, etc., allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

Figure 1:
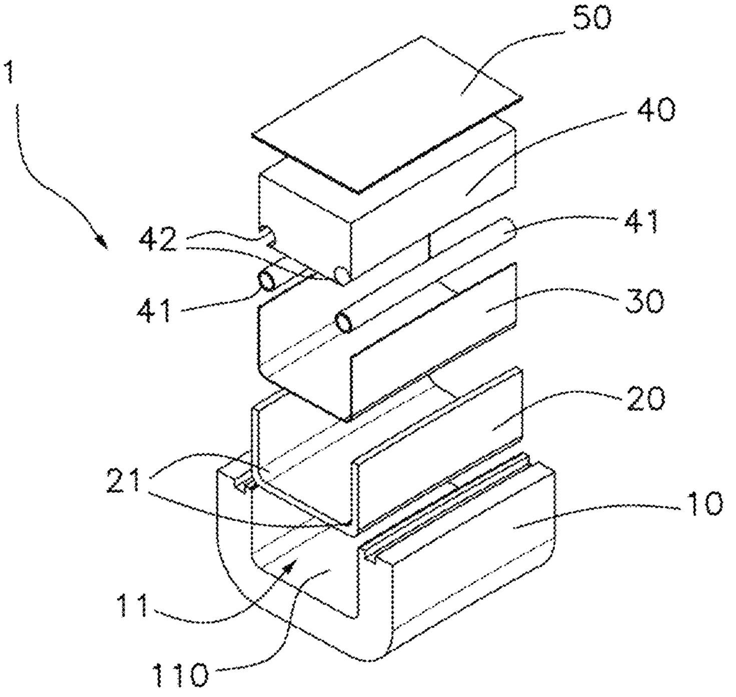
FIG. 1 shows an exploded schematic perspective view of part of a cross-sectioned first exemplary embodiment of a vacuum infusion system for infusing a fibre reinforcement with a resin to produce a composite moulded component according to the present invention.

FIG. 1 shows an exploded schematic perspective view of part of an exemplary embodiment of a vacuum infusion system for infusing a fibre reinforcement with a resin to produce a composite moulded component according to the present invention. The system 1 comprises a mould 10 having a mould cavity 11 comprising a moulding element 110 for the reception of a fibre reinforcement 20. Said mould cavity 11 is defined by the mould 10 and the film 50 for sealing the mould cavity 11, and in particular, said mould cavity 11 is defined as the space or volume defined between the mould 10 and film 50. As can be seen, the counter mould 40 is housed in the mould cavity 11, that is to say, is placed within the volume defined by the film 50 for sealing the mould cavity 11, in other words, the counter mould 40 is placed between the mould 10 and the film 50 for sealing the mould cavity 11. In the exemplary embodiment shown, the laminate or fibre reinforcement 20 comprises two pairs of intersecting planes arranged so that said fibre reinforcement is U-shaped and comprises two curved regions 21. In components obtained by infusion, intersecting planes commonly define, in the area delimiting a cavity, a curved region or fillet of small radius, as, for example, a 90 degrees sharp corner cannot be obtained, or it is very difficult to do so, in a cost and time effective manner.

Using known vacuum infusion systems and methods, in said curved regions or fillets defined by the intersection of a pair of planes of a mould, the mechanical properties of the moulded component vary, and usually decrease, thereby creating undesired weak areas or regions in the moulded component. Thus, the mechanical properties of the moulded component are not homogenous throughout its entire cross-section. The present invention solves this problem and provides composite moulded components having homogeneous properties throughout its entire cross-section, moreover, such properties can be such that they meet or exceed the highest requirements, as for example, the ones of the aerospace industry. In particular, the vacuum infusion system 1 of the present invention provides composite moulded components having a void content of 2% or less and a fibre volume ratio of 60% or more throughout its entire cross-section.

In addition to the mould 10 and the fibre reinforcement 20, the system 1 of the present invention further comprises at least one layer 30 for being placed on the fibre reinforcement 20. Said layer 30 can be configured to avoid adhesion to the fibre reinforcement 20, and, in particular, to avoid adhesion of a counter mould 40 and/or other auxiliary elements to the fibre reinforcement 20. In this first exemplary embodiment, the counter mould 40 comprises a chamber 41 inflatable by a pressurised fluid for each curved region 21 of the fibre reinforcement 20. Each chamber 41 is configured to apply a pressure to its corresponding curved region 21 of the fibre reinforcement 20. The chambers 41 can be integrated in the counter mould 40 (see FIG. 12) or can be a tubular chamber of a flexible material partially housed in a respective recess 42 of matching shape in the counter mould 40 and protruding from it, as in this first exemplary embodiment. Other arrangements of the chambers 41 are also possible. The system 1 is preferably configured so that the chambers 41 when inflated by the pressurised fluid apply a pressure to the respective curved regions 21 of the fibre reinforcement 20 infused with resin, that is to say, apply a pressure to the curved regions 21 once the fibre reinforcement 20 has been infused with resin, and not before. Said pressurised fluid may be a gas, such as air, or a liquid, such as water or oil, among others.

The system 1 further comprises a membrane or film 50 for sealing the mould cavity 11. The membrane or film 50 is usually placed above the previously mentioned elements so that the fibre reinforcement 20, the at least one layer 30 and the counter mould 40 are housed within the space defined by the mould 10 and the membrane or film 50. The membrane or film 50 is configured for sealing the mould cavity 11 from the environment so that a vacuum can be created within it.

The system 1 object of the present invention may further comprise a resin reservoir fluidly connected to a first end of the mould cavity 11 and a vacuum pump fluidly connected to the mould cavity 11 at the second end thereof, said second end being opposite to the first end. However, the resin reservoir and the vacuum pump are not depicted in FIG. 1.

Figure 2:
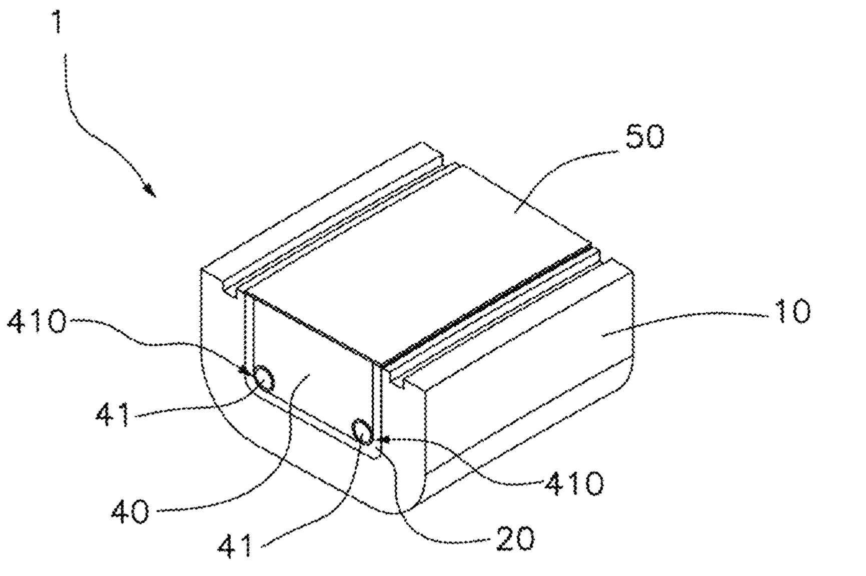
FIG. 2 shows a schematic perspective view of part of the first exemplary embodiment of a vacuum infusion system according to the present invention shown in FIG. 1.

FIG. 2 shows a schematic perspective view of part of the first exemplary embodiment of a vacuum infusion system 1 shown in FIG. 1. In contrast with FIG. 1 where the depicted elements of the system are exploded, in FIG. 2 the elements are not exploded, i.e., are in its work or operating position. As can be seen, in the depicted embodiment the membrane or film 50 is substantially flush with the upper part of the mould 10 and of the counter mould 40.

In this first exemplary embodiment, the chambers 41 inflatable by a pressurised fluid housed in the corresponding recess 42 define the corresponding curved regions 410 of the counter mould 40.

Figure 3:
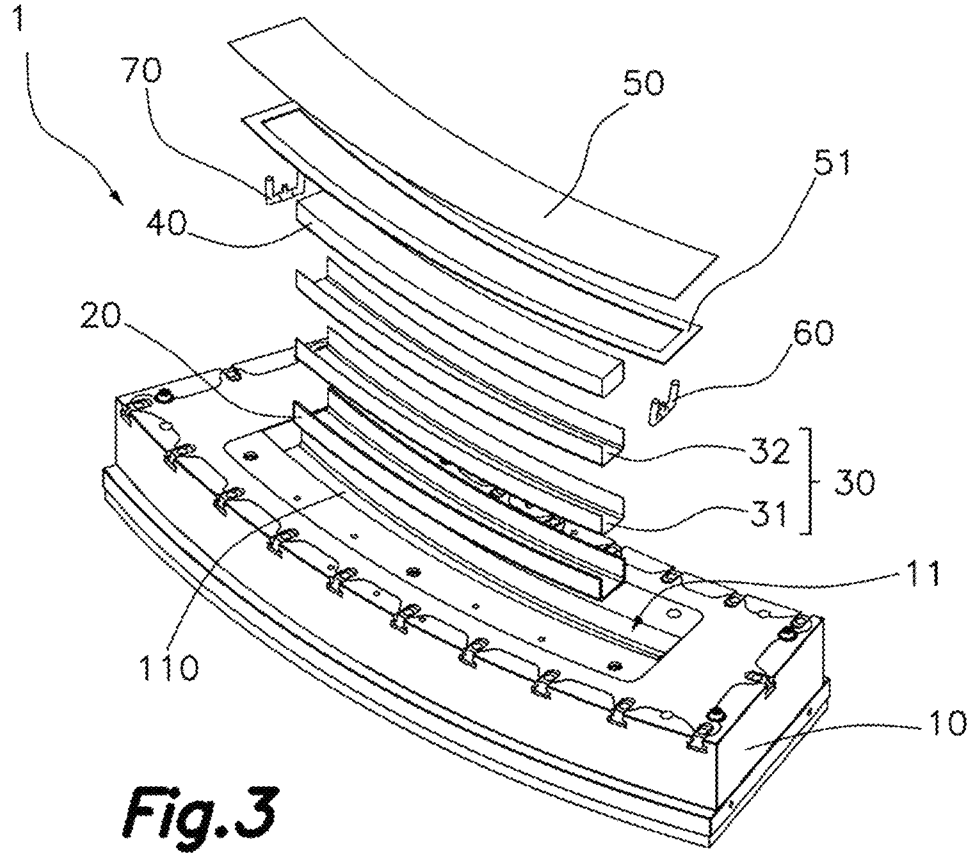
FIG. 3 shows an exploded perspective view of the first exemplary embodiment of a vacuum infusion system according to the present invention shown in FIGS. 1 and 2.

FIG. 3 depicts an exploded perspective view of the first exemplary embodiment of a vacuum infusion system 1 shown in FIGS. 1 and 2. In the exemplary embodiment shown, the vacuum infusion system 1 is configured to produce a composite moulded component having a rectangular U-shaped cross-section and being curved along its longitudinal axis, i.e., forming an arch. Therefore, in the exemplary embodiment shown, the mould cavity 11 also has a U-shaped cross-section and is curved along its longitudinal axis, matching the shape of the fibre reinforcement 20. In this case, the outer shape of the mould 10 is also curved along its longitudinal axis, although it could have any other suitable shape.

The mould cavity 11 of the mould 10 comprises a moulding element 110 for the reception of the fibre reinforcement 20. In the exemplary embodiment shown, a surface of the moulding cavity 11 acts as a moulding element 110. However, in other embodiments the moulding element 110 can be, for example, a counter mould 40.

In the present case, the at least one layer 30 to be placed on the fibre reinforcement 20 comprises a peel ply 31 and a flow mesh 32. The peel ply 31 is configured to avoid adhesion of the flow mesh 32 and the counter mould 40, and its chambers 41 inflatable by a pressurised fluid, to the fibre reinforcement 20. The flow mesh 32 is configured to distribute the flow of resin during the infusion of resin so that the fibre reinforcement 20 is uniformly infused with said resin. The flow mesh 32 can be made of polyamide or polypropylene, among others, depending on the working temperature of the system. The peel ply 31 and the flow mesh 32 are preferably shaped substantially similar to the fibre reinforcement 20.

In the present exemplary embodiment, the counter mould 40 is placed above the flow mesh 32. Although chambers 41 inflatable by a pressurised fluid of the counter mould 40 have not been depicted in this picture to simplify the drawing, said counter mould 40 does have the corresponding chambers 41. However, in other embodiments of a system 1 according to the present invention, the counter mould 40 could effectively lack such chambers 41 (see FIGS. 13 and 14).

At a first end the mould cavity 11 the system 1 comprises a resin inlet 60 fluidly connected to a resin reservoir (not depicted). At a second end of the mould cavity 11, said second end being opposite to the first end, the system 1 comprises an inlet port 70 to a vacuum pump (not depicted). The arrangement of the resin inlet 60 and of the inlet port 70 of the vacuum pump in opposite ends of the mould cavity 11 eases the flow of resin throughout the mould cavity 11 and the fibre reinforcement 20.

In the embodiment shown, system 1 is configured so that a vacuum of 20 mbar or less of absolute pressure can be created within the mould cavity 11.

The fibre reinforcement 20 may be made of: carbon fibre, fibre glass, poly (p-phenylenediamine terephthalamide), poly (m-phenylenediamine isophthalamide), basalt fibres, natural fibres or any other suitable thermoplastic fibre. Poly (p-phenylenediamine terephthalamide) is commonly known as Nomex® and poly (m-phenylenediamine iothalamate) is commonly known as Kevlar®. In the exemplary embodiment shown the fibre reinforcement 20 is made of carbon fibre.

A film 50 is placed on top of the mould 10 and sealing the mould cavity 11 so that a vacuum can be created in the mould cavity and there are no leaks of resin to the environment, which is one of the benefits of close mould infusion systems as the one of the present invention. In this exemplary embodiment, a sealant tape 51 is used to attach the film 50 to the mould 10 in a sealing manner. The sealant tape 51 is also known as Tacky Tape®. However, other means for sealing the mould cavity 11 can also be used.

Figure 4:
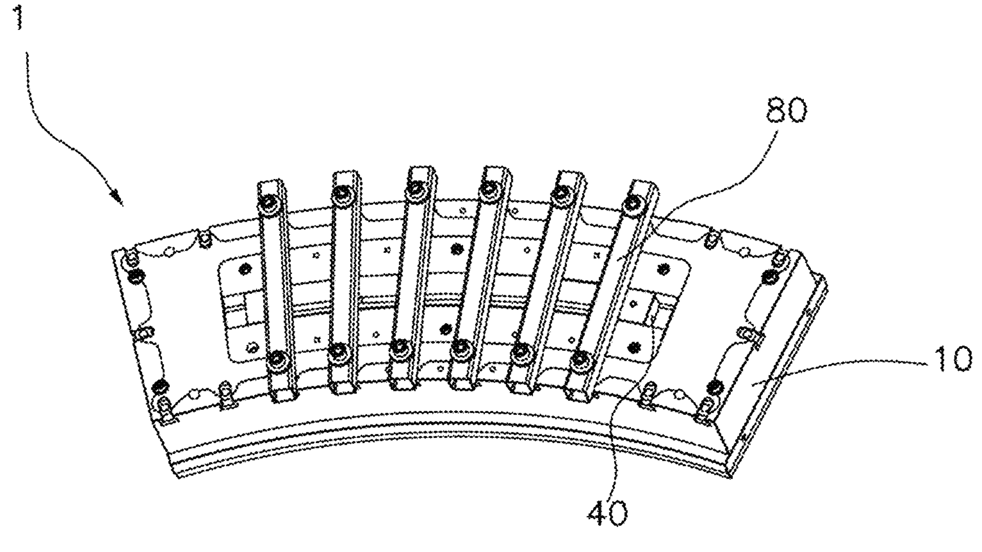
FIG. 4 shows a perspective view of a second exemplary embodiment of a vacuum infusion system according to the present invention.

FIG. 4 shows a perspective view of a second exemplary embodiment of the vacuum infusion system 1 according to the present invention. When compared to the first exemplary embodiment shown in FIGS. 1 to 3, this second exemplary embodiment of a vacuum infusion system 1 further comprises a press 80 for applying a pressure to the counter mould 40 in a direction perpendicular to a longitudinal axis of the moulded component, so that the fibre volume ratio is further increased and/or the void content of the composite moulded component is further reduced. Said press 80 is preferably mechanical or hydraulic, although any other suitable kind of press can also be used.

The press 80 applies a pressure to the counter mould 40 and said counter mould 40 transfers said pressure to the fibre reinforcement 20 which has been previously infused with resin. Therefore, the counter mould 40, and its chambers 41 inflatable by a pressurised fluid, as well as the film 50 for sealing the mould cavity 11, need to withstand the pressure applied by the press 80. In the exemplary embodiment shown, the counter mould 40 is made of a silicone having a Shore A hardness of 55 and a Poisson's ratio of 0.49.

Figure 5:
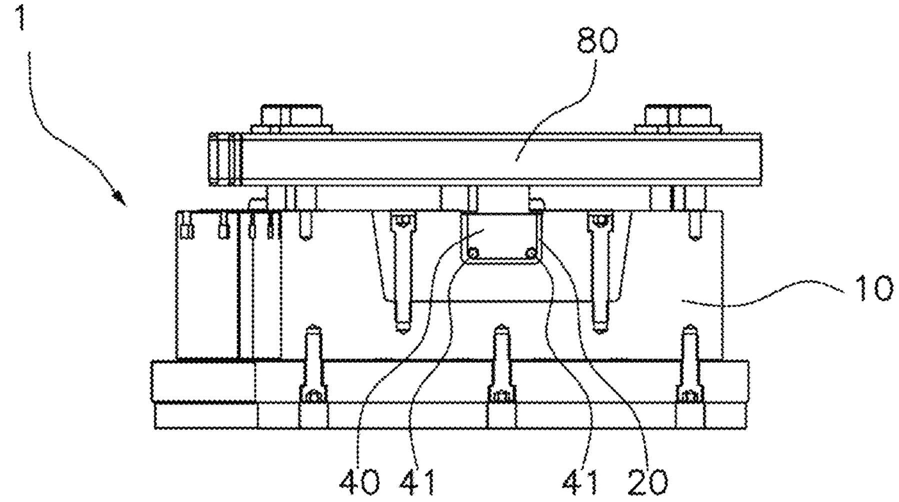
FIG. 5 shows a cross-sectional view of the second exemplary embodiment of a vacuum infusion system shown in FIG. 4.

The arrangement of the press 80, the counter mould 40, the fibre reinforcement 20 and the mould 10, and further auxiliary elements can be seen in greater detail in FIG. 5 which shows a cross-sectional view of the vacuum infusion system of FIG. 4.

Due to the combination of a vacuum infusion method and system with a press, the vacuum infusion system and method object of the present invention can be named as a hybrid vacuum infusion system and method.

Figure 12:
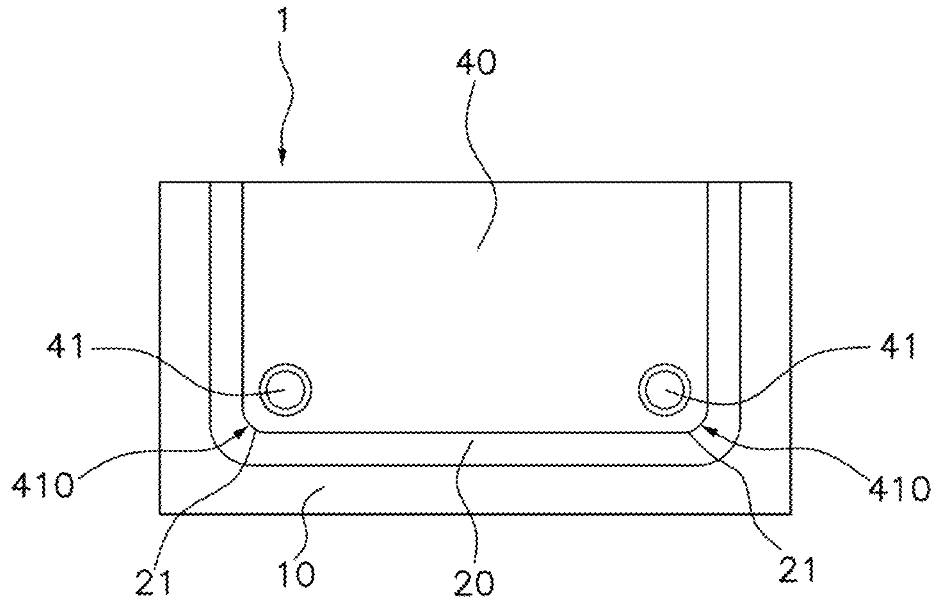
FIG. 12 shows a schematic cross-sectional view of a ninth exemplary embodiment of a vacuum infusion system according to the present invention.

The press 80 of this second exemplary embodiment can also be used in embodiments wherein the counter mould 40 lack chambers 41 inflatable by a pressurised fluid (see FIGS. 13 and 14) and in embodiments wherein the chambers 41 are integral with, i.e., formed in, the counter mould 40 (see FIG. 12).

FIGS. 6 to 10 show different arrangements of one or more counter moulds 40 and other elements of embodiments of the system 1 of the first aspect of the present invention, each one being configured to infuse composite moulded components having different cross-sections.

Figure 6:
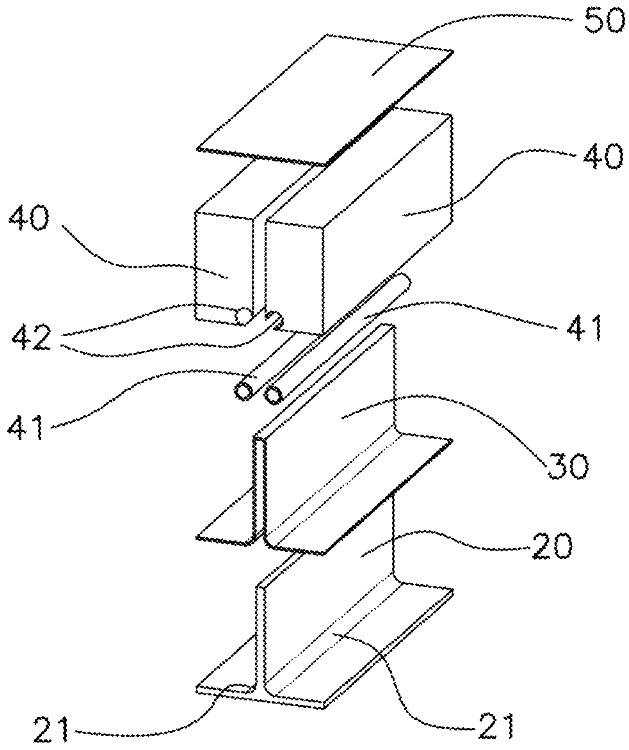
FIG. 6 shows a perspective view of the counter mould and other elements of a third exemplary embodiment of a vacuum infusion system according to the present invention for infusing a T shaped composite moulded component.

FIG. 6 shows the arrangement of a fibre reinforcement 20, at least one layer 30 for avoiding adhesion, two counter moulds 40, each one having a single chamber 41 inflatable by a pressurised fluid and a sealing membrane or film 50, for infusing a composite moulded component having a T-shaped cross-section.

A T-shaped fibre reinforcement 20 as the one shown comprises two fillets or curved regions 21 and is configured to be placed on a planar surface of a moulding cavity of a mould. On said T-shaped fibre reinforcement 20 is placed at least one layer 30 for avoiding adhesion having a matching shape. At each side of the T-shaped fibre reinforcement 20 is placed a counter mould 40 having a single chamber 41 inflatable by a pressurised fluid housed in a corresponding recess 42. Each chamber 41 is configured to apply a pressure to the corresponding curved region 21 once the fibre reinforcement 20 has been infused with resin, preferably while the resin is being cured. In this embodiment, each counter mould 40 is of substantially rectangular prismatic shape. On top of said elements, sealing the moulding cavity of the mould, a sealing film 50 is placed.

Figure 7:
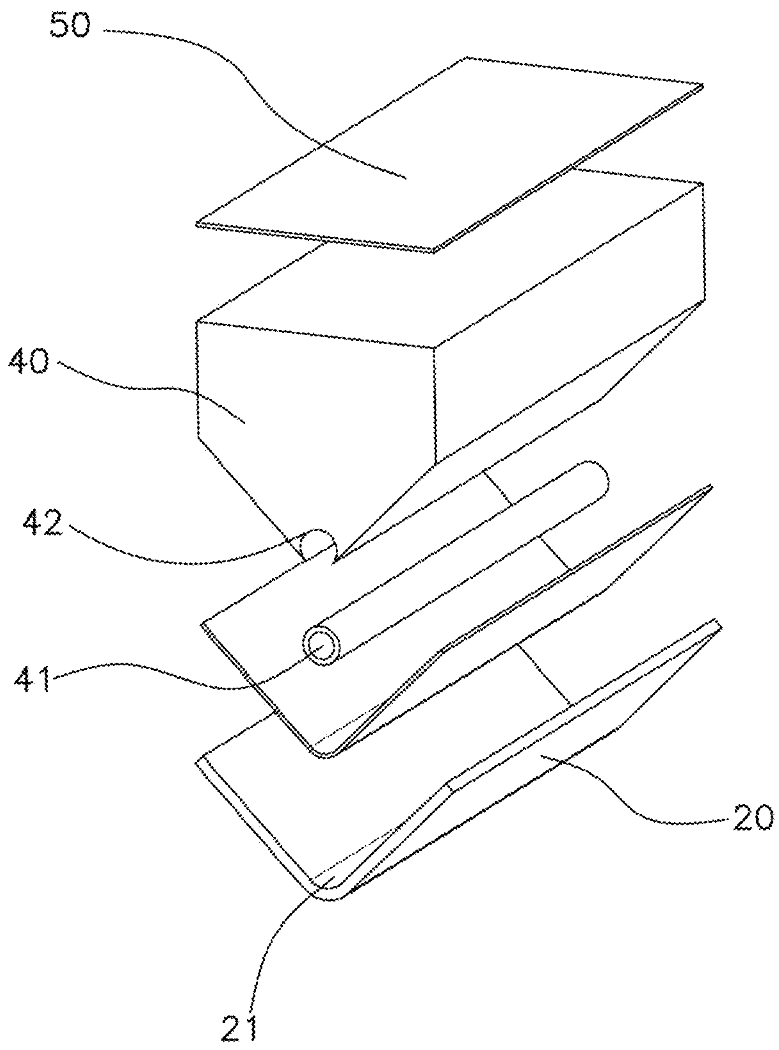
FIG. 7 shows a perspective view of the counter mould and other elements of a fourth exemplary embodiment of a vacuum infusion system according to the present invention for infusing a V shaped composite moulded component.

FIG. 7 shows the arrangement of a fibre reinforcement 20, at least one layer 30 for avoiding adhesion, one counter mould 40 having a single chamber 41 inflatable by a pressurised fluid and a sealing film 50, for infusing a composite moulded component having a V-shaped cross-section. In the exemplary embodiment shown, the V-shaped fibre reinforcement 20 is configured to be placed on a V-shaped surface of a moulding cavity of a mould. Above the fibre reinforcement 20 is placed at least one V-shaped layer 30 for avoiding adhesion to the fibre reinforcement 20. In this embodiment, the counter mould 40 has a substantially V shaped cross-section matching the inner surface of the at least V-shaped layer 30. Said counter mould 40 comprises a single chamber 41 inflatable by a pressurised fluid housed in a respective recess 42, said chamber 41 being configured to apply a pressure to the curved region 21 of the V-shaped fibre reinforcement 20.

Figure 8:
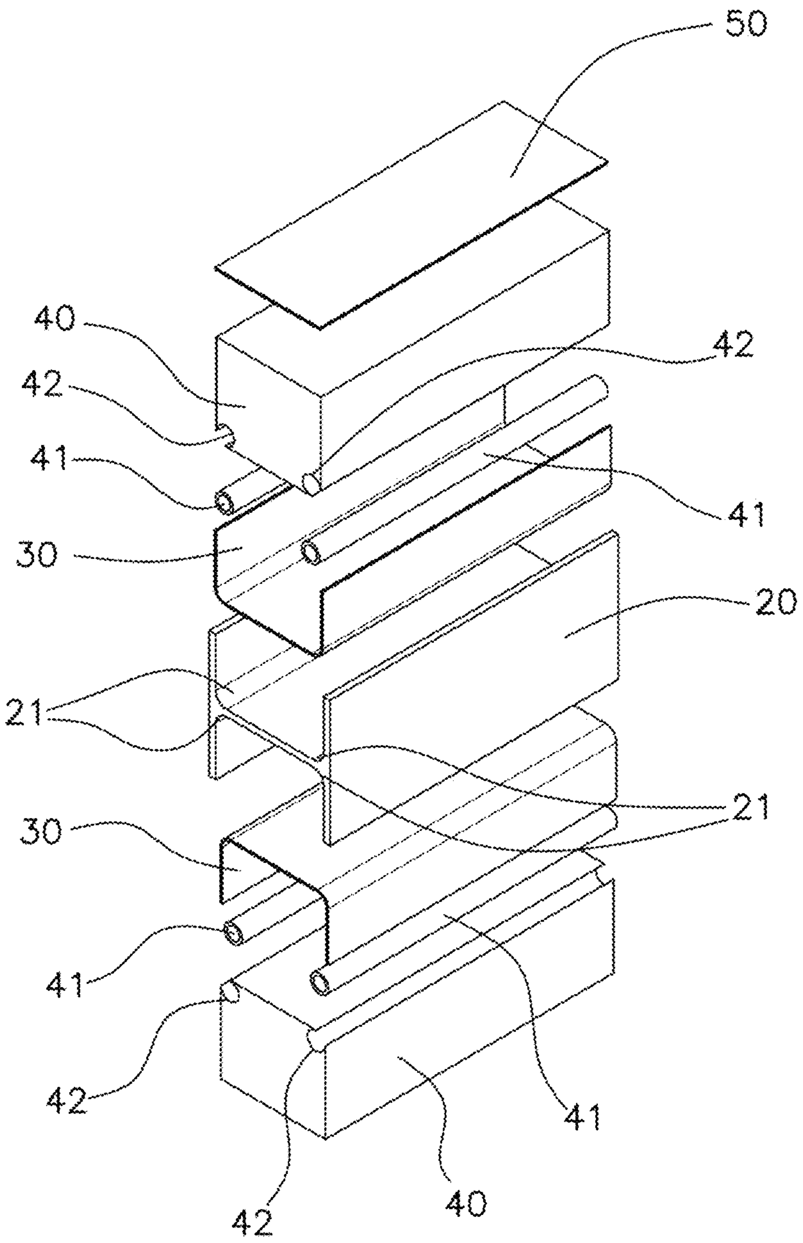
FIG. 8 shows a perspective view of the counter mould and other elements of a fifth exemplary embodiment of a vacuum infusion system according to the present invention for infusing an H shaped composite moulded component.

FIG. 8 shows the arrangement of a fibre reinforcement 20, two layers 30 for avoiding adhesion, two counter moulds 40, each one having two chambers 41 inflatable by a pressurised fluid and a sealing film 50, for infusing a composite moulded component having an H-shaped cross-section. In this embodiment, the moulding element is a counter mould 40 instead of a surface of the moulding cavity of the mould. In this arrangement, a first substantially prismatic counter mould 40 is placed on a surface of a moulding cavity of a mould, said counter mould having a pair of chambers 41 inflatable by a pressurised fluid housed in respective recesses 42. On the counter mould 40 there is a first layer 30 which can comprise a peel ply 31 and/or a flow mesh 32 (see FIG. 3). On said first layer 30 there is an H-shaped fibre reinforcement 20. On said H-shaped fibre reinforcement 20 there is a second layer 30 for avoiding adhesion and a second substantially prismatic counter mould 40 having a pair of chambers 41 inflatable by a pressurised fluid housed in respective recesses 42. Over the described elements, a sealing membrane or film 50 seals the moulding cavity. The H-shaped fibre reinforcement 20 shown in FIG. 8 has four curved regions 21, and therefore, the system also comprises four chambers 41 inflatable by a pressurised fluid to apply a pressure to their corresponding curved region 21 before infusing the resin to the fibre reinforcement 20.

Figure 9:
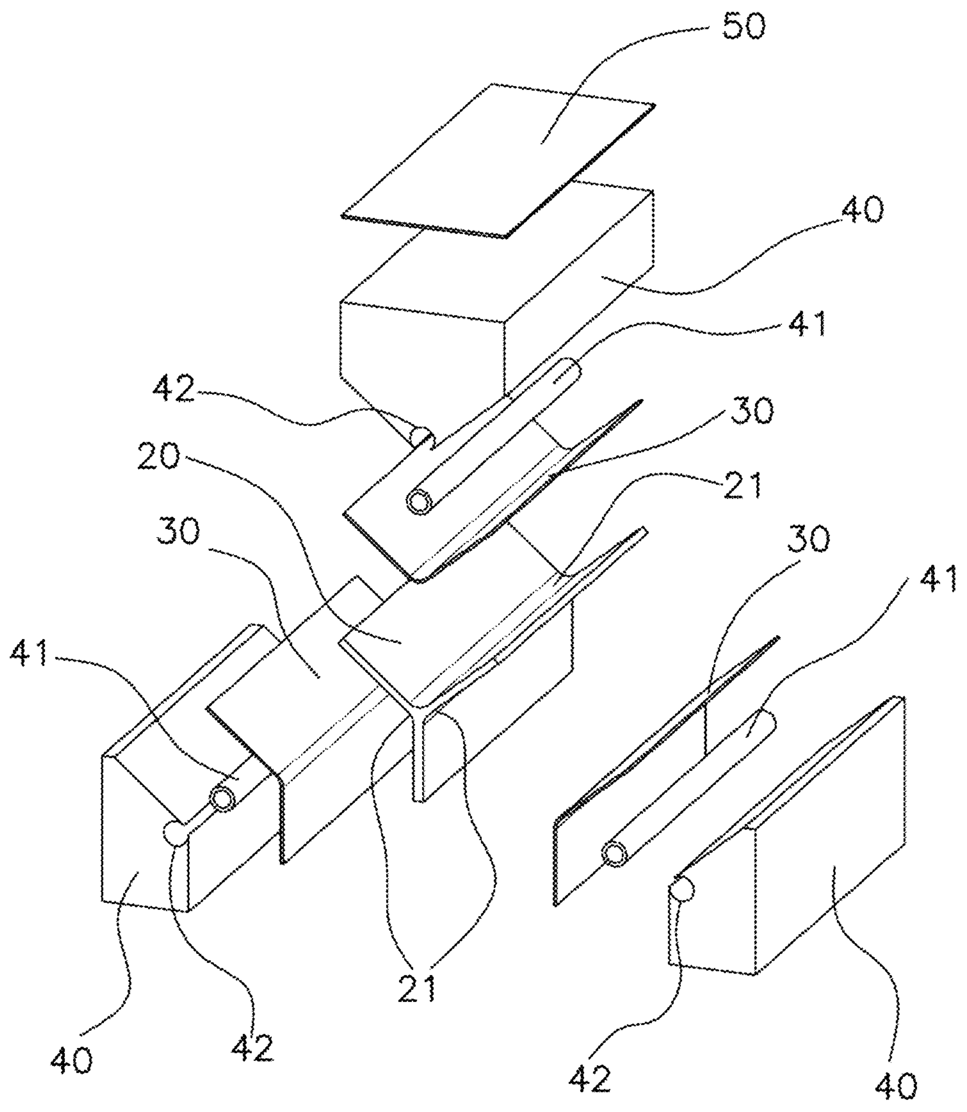
FIG. 9 shows a perspective view of the counter mould and other elements of a sixth exemplary embodiment of a vacuum infusion system according to the present invention for infusing an Y shaped composite moulded component.

FIG. 9 shows the arrangement of a fibre reinforcement 20, three layers 30 for avoiding adhesion, three counter moulds 40 having each one a single chamber 41 inflatable by a pressurised fluid, and a sealing film 50, for infusing a composite moulded component having a Y-shaped cross-section. As it can be seen, in this embodiment a Y-shaped fibre reinforcement 20 is placed on two opposite counter moulds 40 acting as a moulding surface. Between the counter moulds 40 and the fibre reinforcement 20 there is a respective layer 30 for avoiding adhesion. On the Y-shaped fibre reinforcement, there is a further layer 30 for avoiding adhesion and on top of said layer 30 there is a further counter mould 40. As in the previously described embodiments, a sealing film 50 is configured to seal the moulding cavity of the mould. Each chamber 41 inflatable by a pressurised fluid is configured to apply a pressure to a respective curved region 21 of the fibre reinforcement 20.

Figure 10:
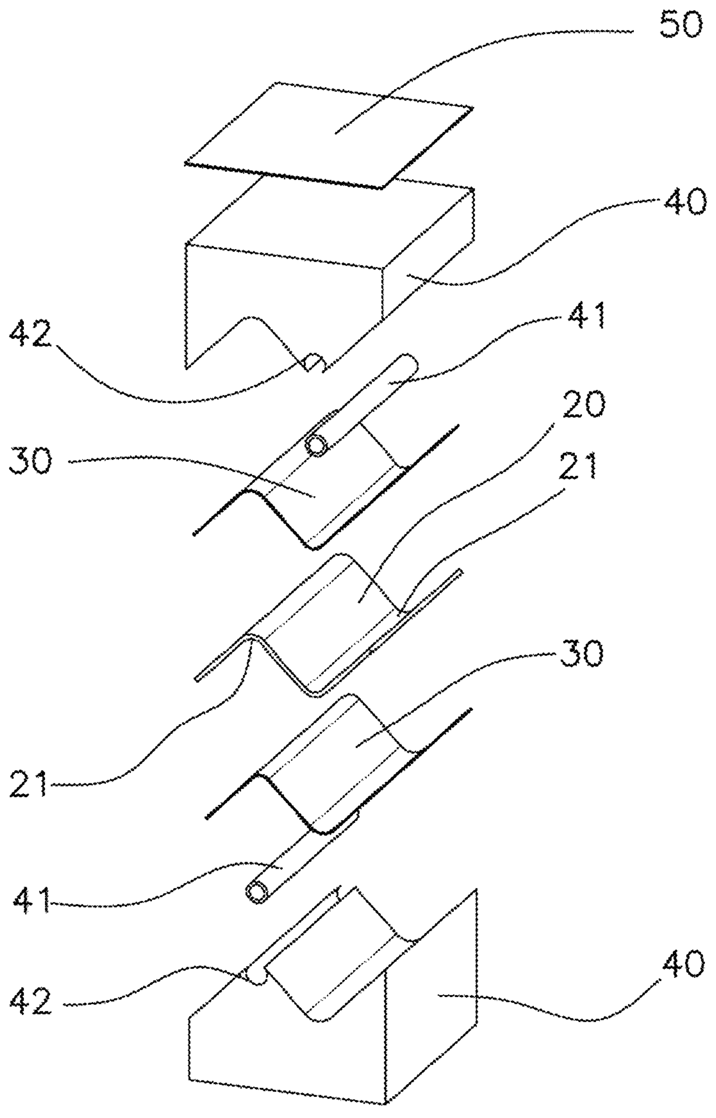
FIG. 10 shows a perspective view of the counter mould and other elements of a seventh an embodiment of a vacuum infusion system according to the present invention for infusing a Z shaped composite moulded component.

FIG. 10 shows the arrangement of a fibre reinforcement 20, two layers 30 for avoiding adhesion, two counter moulds 40 having each one a single chamber 41 inflatable by a pressurised fluid, and a sealing film 50, for infusing a composite moulded component having a Z-shaped cross-section. In this embodiment, a counter mould 40, which has a Z-shaped top part, acts as a moulding element. Said Z-shaped top part of the counter mould 40 receives a layer 30 for avoiding adhesion and on top of said layer is placed the Z-shaped fibre reinforcement 20. On top of the Z-shaped fibre reinforcement 20 there is a further layer 30 for avoiding adhesion and a further counter mould 40. A sealing film 50 over the further counter mould 40 closes the moulding cavity in a sealing manner. As it can be observed, such arrangement comprises two chambers 41 inflatable by a pressurised fluid for applying a pressure to the two curved regions 21 of the fibre reinforcement 20.

In the exemplary embodiments depicted in FIGS. 6 to 10, the at least one layer 30 to be placed on the fibre reinforcement 20 can comprise a peel ply 31 and a flow mesh 32 as described in the context of FIG. 4.

The above-mentioned arrangements are only exemplary and moulded components having similar cross-sections could also be produced having different arrangements of the fibre reinforcements 20, counter moulds 40, etc. In particular, in FIGS. 6 to 10 the counter moulds 40 have one or more recesses 42 for housing respective chambers 41 for a pressurised fluid. However, in other embodiments one or more chambers 41 for a pressurised fluid can be integrated into the counter mould 40 (see FIG. 12) or lack such chambers 41 (see FIGS. 13 and 14). The pressurised fluid can be any suitable gas or any suitable liquid, as for example, air, water, oil, etc.

FIGS. 11 to 18 show, in a schematic cross-sectional view, four different exemplary embodiments of a vacuum infusion system 1 according to the present invention. Said four different exemplary embodiments substantially differ in the configuration of the counter mould 40 and the pressure applying configuration used to transmit a pressure to the one or more curved regions 21 of the fibre reinforcement 20.

Figure 11:
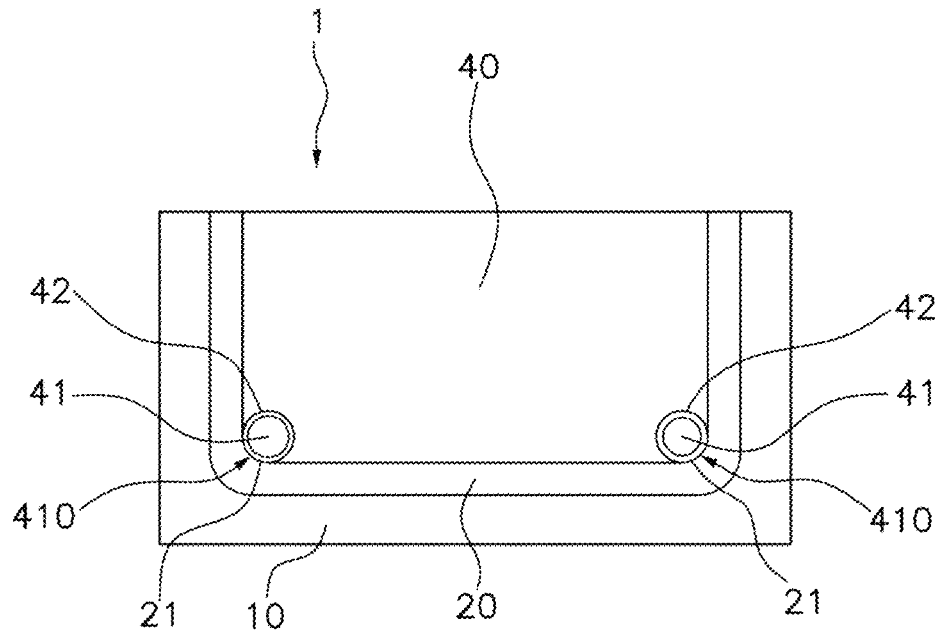
FIG. 11 shows a schematic cross-sectional view of an eighth exemplary embodiment of a vacuum infusion system according to the present invention.

FIG. 11 shows a schematic cross-sectional view of an eighth exemplary embodiment of a vacuum infusion system 1 according to the present invention. In this exemplary embodiment, the counter mould 40 comprises two recesses 42 that receive and partially house a corresponding chamber 41 inflatable by a pressurized fluid. Once housed in their corresponding recess 42, the chambers 41 of this exemplary embodiment define the curved region 410 of the counter mould 40.

In this eighth exemplary embodiment the counter mould 40 can be made of a rigid material, such as any type of suitable metal, or from a flexible material, such as silicone having a Shore A hardness equal or greater than 20, preferably equal or greater than 55.

FIG. 12 shows a schematic cross-sectional view of a ninth exemplary embodiment of a vacuum infusion system 1 according to the present invention. This exemplary embodiment differs from the one shown in FIG. 11 mainly in that in the ninth exemplary embodiment the chambers 41 inflatable by a pressurised fluid are integral with the counter mould 40, i.e., the chambers 41 are formed in the counter mould 40, so that the counter mould 40 and the chambers 41 are a single element. In contrast, in the exemplary embodiment shown in FIG. 11 the chambers 41 and the counter mould are separate elements.

The ninth exemplary embodiment comprises a counter mould 40 made of a suitable flexible material, preferably silicone, so that when the chamber is inflated, the walls of the counter mould 40 between the curved region 410 and the corresponding chamber 41 can be slightly deformed and apply a pressure to the curved region 21 of the fibre reinforcement.

Both the exemplary embodiments of FIG. 11 and FIG. 12 can be subsequently used with a press 80 to apply a further pressure to the counter mould 40 in a direction perpendicular to the longitudinal axis of the moulded component.

Figure 13:
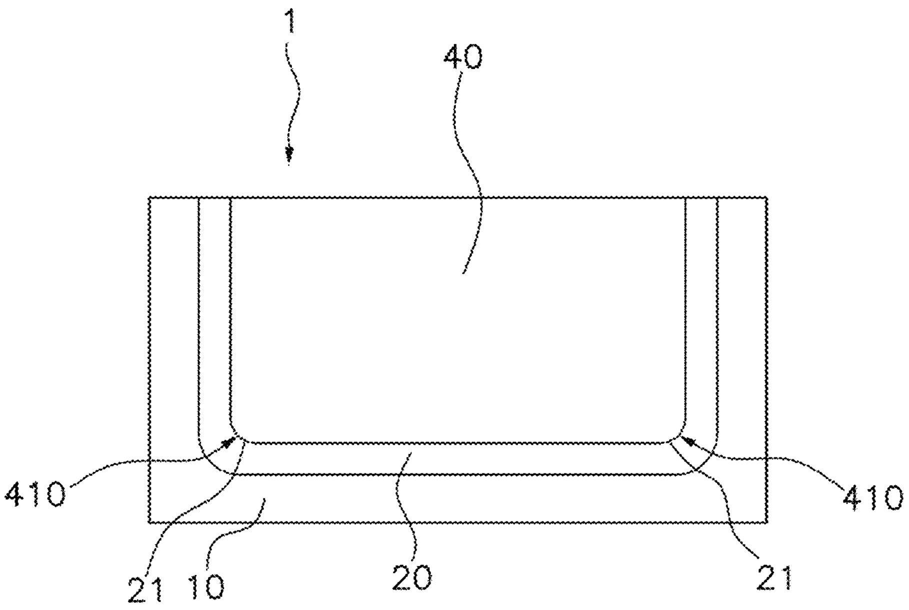
FIG. 13 shows a schematic cross-sectional view of a tenth exemplary embodiment of a vacuum infusion system according to the present invention.

FIG. 13 shows a schematic cross-sectional view of a tenth exemplary embodiment of a vacuum infusion system 1 according to the present invention. In this exemplary embodiment, the counter mould 40 is a solid block of a suitable flexible material, preferably silicone, so that when pressed with a pressing unit in a direction perpendicular to the longitudinal axis of the moulded component, the curved regions 410 of the counter mould 40 transmit a pressure to the curved regions 21 of the fibre reinforcement 20, as well as to the straight or planar regions of the fibre reinforcement 20.

Figure 14:
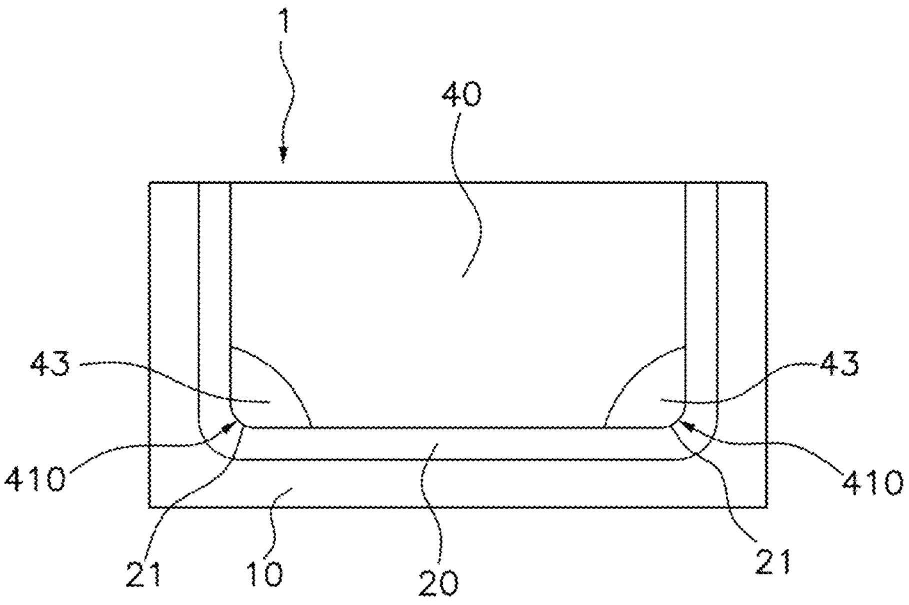
FIG. 14 shows a schematic cross-sectional view of an eleventh exemplary embodiment of a vacuum infusion system according to the present invention.

FIG. 14 shows a schematic cross-sectional view of an eleventh exemplary embodiment of a vacuum infusion system 1 according to the present invention wherein the counter mould 40 is made of a solid material, for example, any suitable plastic or metal, and comprises one flexible part 43 for each curved region 21 of the fibre reinforcement 20. Each curved part 43 defines a corresponding curved region 410 of the counter mould and is made of a flexible material, preferably silicone.

In the exemplary embodiments of FIGS. 1 to 14, besides having a Shore A hardness equal or greater than 20, preferably equal or greater than 55, the silicone also has a Poisson ratio greater than 0.4, preferably greater than 0.45.

The teachings described in the context of FIGS. 11 to 14 having a U-shaped fibre reinforcement 20 can also be applied to fibre reinforcements 20 having different shapes, for example, the ones shown in FIGS. 6 to 9.

With reference to the previously described FIGS. 1 to 14, the vacuum infusion method for infusing a fibre reinforcement with a resin to produce composite moulded components object of the second aspect of the present invention will be described hereinafter.

The method comprises the steps of: providing a mould 10 having a mould cavity 11; laying a fibre reinforcement 20 on at least a moulding element 110 in the mould cavity 11; placing at least one layer 30 on the fibre reinforcement 20, said layer 30 being configured to avoid adhesion to the fibre reinforcement 20; placing at least one counter mould 40 on the at least one layer 30, said counter mould 40 comprising one or more flexible parts, each flexible part including at least one curved region 410 for forming at least one curved region 21 on the fibre reinforcement 20 infused with resin; sealing the mould cavity 11; creating a vacuum in the mould cavity 11 with a vacuum pump fluidly connected to a first end of the mould cavity 11; providing a resin supply to the mould cavity 11 to a second end of the mould cavity 11, said second end being opposite to the first end; infusing the fibre reinforcement 20 with the resin; applying a pressure at least on the at least one curved region 410 of the one or more flexible parts of the counter mould 40 with a pressure applying configuration, to transmit a pressure to the at least one curved region 21 of the fibre reinforcement 20 infused with resin; and curing the resin. Optionally, the method may further comprise the step of removing the moulded component from the mould 10. The mould cavity 11 is preferably sealed with a suitable film 50, arranged so that the counter mould 40 is housed within the mould cavity 11, i.e., the counter mould 40 is housed within the cavity defined by the film 50 and the mould 10.

In the method of the second aspect of the present invention, the pressure to the curved region(s) 21 of the fibre reinforcement 20 can be applied with a corresponding chamber 41 inflatable by a pressurised fluid comprised in a counter mould 40 (see FIGS. 11 and 12) or with a press 80 that applies a pressure to a counter mould having one or more flexible parts (see FIG. 14) or to a counter mould 40 being made completely made of a flexible material (see FIG. 13), among others.

Said chamber 41 may be integral with the counter mould or may be a tubular chamber housed in a respective recess 42 of matching shape in the counter mould 40.

In embodiments comprising one or more chambers 41 inflatable by a pressurised fluid, said chambers 41 can be used to apply a pressure of from 0.5 to 5 bars to the corresponding curved regions 21 of the fibre reinforcement The method can further comprise the step of applying a further pressure to the at least one counter 40 mould in a direction perpendicular to a longitudinal axis of the moulded component to further increase the fibre volume ratio of the composite moulded component and to further reduce its void content, that is to say, to increase the mechanical properties of the composite moulded component. Said pressure is applied to the counter mould 40 preferably with a press 80, which can be of any suitable type, e.g., mechanical, hydraulic, etc. It is important to mention that this second or further pressure is not applied directly to the infused fibre reinforcement 20 by said press 80. On the contrary, said pressure is applied to the curved region(s) 21 of the fibre reinforcement 20 via the counter mould 40. Said press 80 can apply a pressure of from 1.5 to 20 bars to the at least one counter mould 40.

The moulding element 110 where the fibre reinforcement 20 is placed can be a surface of the mould cavity 11 of the mould 10 or at least one counter mould 40. In the latter case, the moulding element can further comprise at least a layer 30 for avoiding adhesion. Said at least one layer 30 to be placed on the fibre reinforcement 20 can comprise a peel ply 31 and a flow mesh 32 as described in the context of FIG. 4. The fibre reinforcement 20 can be made, among others, of at least one of: carbon fibre, fibre glass, poly (p-phenylenediamine terephthalamide), poly (m-phenylenediamine iothalamate), thermoplastic fibres, basalt fibres or natural fibres. Said fibre reinforcement 20 can have, for example, a U, T, Z, H, I or Y cross-section.

According to a third aspect of the present invention (not shown), it is also disclosed a composite moulded component obtainable by the vacuum infusion method of the present invention described hereinabove. Said composite moulded component can have, among others, a U, T, Z, H, I or Y cross-section. Said composite moulded component according to the third aspect of the present invention can have a void content of 2% or less and a fibre volume ratio of 60% or more throughout its entire cross-section.

According to a fourth aspect of the present invention (not shown), it is also disclosed a vacuum infusion system a vacuum infusion system for infusing a fibre reinforcement with a resin to produce a composite moulded component comprising: a mould having a mould cavity comprising at least one moulding element for the reception of a fibre reinforcement; a rigid counter mould for forming at least one curved region on the fibre reinforcement infused with resin; at least one layer for being placed on the fibre reinforcement, said layer being configured to avoid adhesion to the fibre reinforcement; a film for sealing the mould cavity; a resin reservoir fluidly connected to a first end of the mould cavity; a vacuum pump fluidly connected to a second end of the mould cavity, said second end being opposite to the first end; wherein the mould comprises a pressure applying configuration to apply a pressure to the at least one curved region of the fibre reinforcement infused with resin, said pressure applying configuration being configured for increasing the fibre volume ratio and/or reducing the void content of the composite moulded component.

According to the fourth aspect of the present invention, the mould can comprise a recess for receiving and partially housing a chamber inflatable by a pressurised fluid to apply a pressure to a corresponding curved region of the fibre reinforcement infused with resin. In this case, the counter mould should be rigid in order to ensure the dimensional stability of the composite moulded component.

A composite moulded component of the present invention differs from other composite moulded components known in the art in that the one of the present invention has homogenous properties throughout its entire cross-section due to the pressure applied in its curved regions. Moreover, the composite moulded component can have an increased fibre volume ratio and/or a reduced void content if the step of applying a pressure in a direction perpendicular to the longitudinal axis of the moulded component is carried out. It will be understood that teachings described in the context of the vacuum infusion system according to the present invention can also be applied to the vacuum infusion method according to the present invention, and vice versa.

It will be understood that various parts of one embodiment of the invention can be freely combined with parts described in other embodiments, even being said combination not explicitly described, provided that such combination is within the scope of the claims and that there is no harm in such combination.

What is claimed is:

1. A vacuum infusion system for infusing a fibre reinforcement with a resin to produce a composite moulded component, the vacuum infusion system comprising:

- a mould with a mould cavity and at least one counter mould with at least one curved region, the counter mould being adapted to be at least partially inserted in the mould cavity, receiving a fibre reinforcement between the mould and the counter mould and to form at least one curved region on a fibre reinforcement contained between the mould and the at least one curved region of the counter mould;
- at least one layer for being placed on the fibre reinforcement, said layer being configured to avoid adhesion of the fibre reinforcement;
- a film for sealing the mould cavity;
- a resin reservoir fluidly connected to a first end of the mould cavity;
- a vacuum pump fluidly connected to a second end of the mould cavity, said second end being opposite to the first end, for infusing the fibre reinforcement with resin;

wherein the at least one counter mould comprises one or more flexible parts, each flexible part including at least one of said curved regions of the counter mould;

- a pressure applying configuration contributing to apply a pressure at least on the at least one curved region of the one or more flexible parts of the counter mould against the mould, to transmit a pressure to the at least one curved region of the fibre reinforcement, infused with resin, said pressure applying configuration being configured for increasing the fibre volume ratio and/or reducing the void content of the composite moulded component;

wherein the at least one counter mould is inserted in the mould cavity, said cavity being closed in a gas-tight manner by the film for sealing the mould cavity; and wherein the fibre reinforcement is placed in a moulding element of the mould cavity, the at least one layer for being placed on the fibre reinforcement is placed between the fibre reinforcement and the at least one counter mould; and the film or sealing the mould cavity is placed over the counter mould.

2. Vacuum infusion system, according to claim 1 wherein the at least one curved region of the counter mould is made of a flexible material having a Poisson ratio greater than 0.4.

3. Vacuum infusion system, according to claim 1, further comprising a pressing unit for applying a pressure to the at least one counter mould in a direction perpendicular to a longitudinal axis of the moulded component configured for further increasing the fibre volume ratio and/or reducing the void content of the composite moulded component.

4. Vacuum infusion system, according to claim 1, wherein at least said one or more flexible parts of the counter mould are made of silicone having a Shore A hardness equal or greater than 20; preferably equal or greater than 55.

5. Vacuum infusion system, according to claim 1, wherein the pressure applying configuration contributes to apply a first pressure to the at least one curved region of the fibre reinforcement and a second pressure to other regions of the fibre reinforcement different to the at least one curved region, the first pressure being equal or greater than the second pressure.

6. Vacuum infusion system, according to claim 5, wherein the other regions of the fibre reinforcement different to the at least one curved region are planar regions or regions having a curvature radius greater than the one of the at least one curved region.

7. Vacuum infusion system, according to claim 1, wherein the at least one curved region of the counter mould in contact with the at least one curved region of the fibre reinforcement comprises at least one chamber inflatable by a pressurised fluid, said chamber being located and configured to apply a pressure to the at least one curved region of the fibre reinforcement infused with resin.

8. Vacuum infusion system, according to claim 7, wherein the counter mould comprises at least one recess for receiving and partially housing the tubular chamber made of a flexible material, made of silicone or made of rubber.

9. A vacuum infusion method for infusing a fibre reinforcement with a resin to produce a composite moulded component, the method comprising the following steps:

- providing a mould with a mould cavity and at least one counter mould with at least one curved region;
- laying the fibre reinforcement on the mould cavity;
- placing at least one layer on the fibre reinforcement, said layer being configured to avoid adhesion of the fibre reinforcement;
- at least partially inserting the at least one counter mould in the mould cavity, on the at least one layer, said at least one counter mould comprising at least one curved region for forming at least one curved region on the fibre reinforcement contained between the mould and the curved region of the counter mould;
- sealing the mould cavity;
- creating a vacuum in the mould cavity with a vacuum pump fluidly connected to a first end of the mould cavity;
- providing a resin supply to a second end of the mould cavity, said second end being opposite to the first end;
- infusing the fibre reinforcement with the resin;
- applying a pressure at least on the at least one curved region of the counter mould against the mould with a pressure applying configuration, transmitting a pressure to the at least one curved region of the fibre reinforcement infused with resin;
- curing the resin;

wherein the curved regions of the counter mould are flexibly deformed under the pressure applied thereto;

wherein the at least one counter mould is inserted in the mould cavity, said cavity being sealed in a gas tight manner with a film for sealing the mould cavity; and wherein the fibre reinforcement is laid on a moulding element of the mould cavity, the at least one layer is placed between the fibre reinforcement and the at least one counter mould; and the film for sealing the mould cavity is placed over the counter mould.

10. Vacuum infusion method, according to claim 9, wherein the counter mould further comprises other regions, different to the curved regions, for forming at least one other region on the fibre reinforcement, different to the curved region; and wherein a first pressure is applied with the pressure applying configuration to the at least one curved region of the fibre reinforcement and a second pressure is applied to the at least one other region, the first pressure being equal or greater than the second pressure.

11. Vacuum infusion method, according to claim 9, wherein the pressure to the at least one curved region of the fibre reinforcement is applied with a chamber inflatable by a pressurised fluid located in correspondence with the at least one curved region and comprised in a counter mould.

12. Vacuum infusion method, according to claim 9, further comprising the step of applying a pressure to the at least one counter mould in a direction perpendicular to a longitudinal axis of the moulded component, after infusing the fibre reinforcement with resin and before curing the resin, to further increase the fibre volume ratio and to reduce the void content of the composite moulded component.

13. Composite moulded component obtainable by a vacuum infusion method according to claim 9.

14. Vacuum infusion method, according to claim 9, wherein a pressure of from 0.5 to 20 bars is applied to the at least one curved region of the fibre reinforcement.

15. Vacuum infusion method, according to claim 14, wherein a pressure of from 0.5 to 5 bars is applied to the at least one curved region of the fibre reinforcement by a tubular chamber inflatable by a pressurised fluid.

* * * * *